United States Patent
Kuramoto et al.

(10) Patent No.: US 11,661,494 B2
(45) Date of Patent: May 30, 2023

(54) ALUMINUM NITRIDE PARTICLES

(71) Applicant: TOKUYAMA CORPORATION, Yamaguchi (JP)

(72) Inventors: Akimasa Kuramoto, Yamaguchi (JP); Yukihiro Kanechika, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 34 days.

(21) Appl. No.: 17/431,966

(22) PCT Filed: Mar. 10, 2020

(86) PCT No.: PCT/JP2020/010224
§ 371 (c)(1),
(2) Date: Aug. 18, 2021

(87) PCT Pub. No.: WO2020/195776
PCT Pub. Date: Oct. 1, 2020

(65) Prior Publication Data
US 2022/0153957 A1    May 19, 2022

(30) Foreign Application Priority Data
Mar. 22, 2019  (JP) .............................. JP2019-055062

(51) Int. Cl.
C08K 3/28       (2006.01)
C01B 21/072    (2006.01)

(52) U.S. Cl.
CPC ............ *C08K 3/28* (2013.01); *C01B 21/0726* (2013.01); *C01P 2004/03* (2013.01); *C01P 2006/12* (2013.01); *C08K 2003/282* (2013.01); *C08K 2201/006* (2013.01)

(58) Field of Classification Search
CPC .......................... C08K 3/28; C08K 2003/282
See application file for complete search history.

(56) References Cited

U.S. PATENT DOCUMENTS

| | | | |
|---|---|---|---|
| 9,929,317 B2 * | 3/2018 | Kashima | H01L 33/22 |
| 2015/0353355 A1 | 12/2015 | Fukunaga et al. | |
| 2019/0031510 A1 | 1/2019 | Kuramoto et al. | |

FOREIGN PATENT DOCUMENTS

| | | |
|---|---|---|
| CN | 104891458 | 9/2015 |
| EP | 3409643 | 12/2018 |
| EP | 3617138 | 3/2020 |
| JP | 3-295863 | 12/1991 |
| JP | 2013-124202 | 6/2013 |
| JP | 6261050 | 1/2018 |
| WO | WO 2012/002545 | 1/2012 |
| WO | WO 2014/123247 | 8/2014 |
| WO | WO 2017/131239 | 8/2017 |
| WO | WO 2018/199322 | 11/2018 |

OTHER PUBLICATIONS

Extended European Search Report for EP Patent Application No. 20778655.9, dated Nov. 17, 2022, 15 pages.
Shatskiy Anton et al: "Aluminum Nitride Crystal Growth from an Al—N System at 6.0 Gpa and 1800° C." Crystal Growth & Design, vol. 10, No. 6, May 6, 2010, pp. 2563-2570.
Komeyak et al.: "Effect of CA-Compound Addition on Synthesis of Ain Powder by Carbothermal Reduction-Nitridation Method" Journal of the Ceramic Society of Japan, International Edition, Fuji Technology Press, Tokyo, JP, vol. 102, No. 7, Jul. 1, 1994, pp. 669-673.
B.M. Epelbaum, et.al, "Natural growth habit of bulk AIN crystals" (Journal of Crystal Growth 265) (2004) pp. 577-581.
International Search Report for PCT/JP2020/010224, dated May 26, 2020, 2 pages.
International Preliminary Report on Patentability for PCT/JP2020/010224, dated Oct. 7, 2021, 10 pages.
Office Action for CN Patent Application No. 202080007229.1, dated Feb. 25, 2023, 6 pages.

* cited by examiner

Primary Examiner — Vickey Nerangis
(74) Attorney, Agent, or Firm — Casimir Jones, SC; Robert A. Goetz (57) ABSTRACT

An aluminum nitride particle including at least a first truncated six-sided pyramid (1-a) and a second truncated six-sided pyramid (1-b), the aluminum nitride particle having a shape such that a lower base (3) of the first truncated six-sided pyramid (1-a) and a lower base (3) of the second truncated six-sided pyramid (1-b) face each other, the first truncated six-sided pyramid (1-a) and the second truncated six-sided pyramid (1-b) each having an upper base (2) with an area S1 of not less than 60 μm² and not more than 4800 μm², and each having a ratio (S1/S2) of the area S1 to an area S2 of the lower base (3) being not less than 0.5 and less than 1, the first truncated six-sided pyramid (1-a) and the second truncated six-sided pyramid (1-b) respectively having a height h1 and a height h2 each being not less than 5 μm and not more than 20 μm.

6 Claims, 3 Drawing Sheets

ALUMINUM NITRIDE PARTICLES

TECHNICAL FIELD

The present invention relates to novel aluminum nitride particles. In particular, provided are aluminum nitride particles which have a large particle diameter and thus, when a resin is filled with, as a heat dissipation filler, the aluminum nitride particles, enables the resin composition, which allows the particles to have many opportunities to contact each other, to have both a high thermal conductivity and a low viscosity.

BACKGROUND ART

Aluminum nitride, which has high thermal conduction and excellent electrical insulation, is used as, for example, a filler for electrical insulation and heat dissipation with which a heat dissipation member is filled.

To improve thermal conduction of a heat dissipation member, it is important to cause fillers each having high thermal conduction to contact each other in the heat dissipation member so that a good thermally conductive path is formed. As a method for forming a good thermally conductive path, there has been employed a procedure of using fillers of large diameter particles to increase the length of the thermally conductive path and using sub fillers of small diameter particles to fill gaps between the fillers of large diameter particles.

As an example of a method for obtaining aluminum nitride particles having a large particle diameter, there has been known a method of adding a sintering aid, an organic binder, and a solvent to aluminum nitride powder and mixing the added substances and the aluminum nitride powder, then drying and granulating the mixture by spray-drying or the like, and then burning the obtained granulated powder having a spherical shape (see Patent Literature 1). The aluminum nitride particles obtained by this method is commonly referred to as "sintered granules", and the method enables production of aluminum nitride particles having a spherical shape and a large particle diameter.

However, sintering causes the sintered granules of aluminum nitride to have a structure in which aluminum nitride particles are bonded by the burning, and such a structure produces, on the surfaces of the aluminum nitride particles, many small irregularities resulting from grooves formed between the particles. This leads to an increase in the viscosity of a resin composition, constituted by the aluminum nitride particles and a resin, obtained by filling the resin with the aluminum nitride particles. In addition, since the aluminum nitride particles are spherical particles so that the particles are in point contact with each other, the area of the contact is small. Thus, there is a room for improvement in thermal conduction of a resin filled with the aluminum nitride particles.

Meanwhile, as aluminum nitride particles which have a polyhedral structure, have a large particle diameter, and thus are capable of increasing a contact area and increasing the length of a thermally conductive path, there have been known plate-shaped particles each having two faces which are hexagonal and which face each other (see Patent Literature 2).

Further, there have been proposed aluminum nitride particles with a shape such that a protrusion is provided at both ends of a hexagonal prism having a polyhedral structure (see Patent Literature 3).

The aluminum nitride particles disclosed in Patent Literatures 2 and 3 are expected to improve thermal conduction of a resin filled with the aluminum nitride particles because the polyhedral structure increases opportunities for faces of the aluminum nitride particles to contact each other. However, their shapes which are constituted largely by a trunk part having sheer side faces restrict the contact between the particles. Accordingly, there has been a demand for developing particles which have a shape capable of making better use of the polyhedral structure.

CITATION LIST

Patent Literatures

[Patent Literature 1]
Japanese Patent Application Publication, Tokukaihei, No. 3-295863
[Patent Literature 2]
Japanese Patent No. 6261050
[Patent Literature 3]
International Publication No. WO 2017/131239

SUMMARY OF INVENTION

Technical Problem

In the related art as described above, there has been a room for improvement in terms of enabling, when a resin composition is obtained by filling a resin with aluminum nitride particles, the resin composition to have high thermal conduction and a low viscosity. Thus, it is an object of the present invention to provide aluminum nitride particles which enable, when a resin composition obtained by filling a resin with the aluminum nitride particles, the resin composition to have high thermal conduction and a low viscosity.

Solution to Problem

To solve the above problem, the inventors of the present invention studied diligently and have eventually found that using aluminum nitride particles with a particular shape enable production of a resin composition having high thermal conduction and a low viscosity. Specifically, the present invention includes the following features.

An aluminum nitride particle, when observed in a scanning electron micrograph at a magnification of 500 times, including at least a first truncated six-sided pyramid and a second truncated six-sided pyramid, the aluminum nitride particle having a shape such that a lower base of the first truncated six-sided pyramid and a lower base of the second truncated six-sided pyramid face each other, the first truncated six-sided pyramid and the second truncated six-sided pyramid each having an upper base with an area S1 of not less than 60 μm$^2$ and not more than 4800 μm$^2$, and each having a ratio (S1/S2) of the area S1 to an area S2 of the lower base of not less than 0.5 and less than 1, the first truncated six-sided pyramid and the second truncated six-sided pyramid respectively having a height h1 and a height h2 each being not less than 5 μm and not more than 20 μm.

A method for producing aluminum nitride powder by reducing and nitriding a raw material mixture including alumina powder, carbon powder, and a sulfur component, the method including: a reduction-nitridation step of reducing and nitriding the raw material mixture under conditions where (i) a concentration of Na$_2$O to be included in the raw material mixture is adjusted to be not more than 0.1% by mass, and (ii) at least in a range of a nitriding rate of not less than 3% and not more than 50%, a gas is composed of a nitrogen gas in an amount of not less than 30% by volume and not more than 85% by volume and a diluent gas in an amount of not less than 15% by volume and not more than 70% by volume; and a retention step of retaining, under an atmosphere in which the aluminum nitride powder formed in the reduction-nitridation step is not oxidized, the aluminum nitride powder for not less than one hour while maintaining a temperature within a variation of plus or minus 30° C. from a heating temperature for the reduction-nitridation step.

Advantageous Effects of Invention

An aspect of the present invention makes it possible to provide aluminum nitride particles which enable, when a resin composition is obtained by filling a resin with the aluminum nitride particles, the resin composition to have high thermal conduction and a low viscosity.

DESCRIPTION OF EMBODIMENTS

Although the following description will discuss an embodiment of the present invention, the present invention is not limited to the embodiment.

<Aluminum Nitride Particles>

Figure 1:
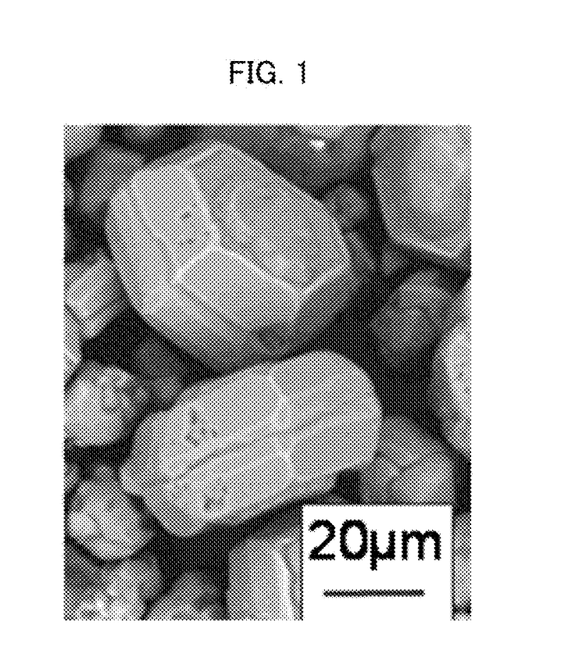
FIG. 1 is a view of a scanning electron micrograph illustrating an aspect of a particle structure of aluminum nitride particles of the present invention.

The characteristics of aluminum nitride particles of the present invention can be found by observation using a scanning electron microscope (SEM) micrograph at a magnification of 500 times. For example, FIG. 1 is an SEM micrograph of an aspect of representative aluminum nitride particles of the present invention obtained in Example 1 (described later), which is captured at a magnification of 500 times.

Figure 2:
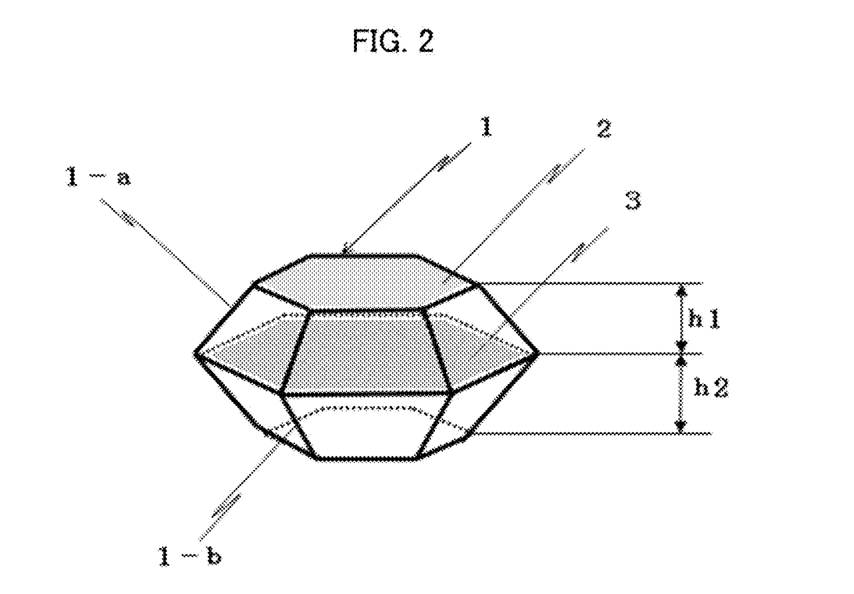
FIG. 2 is a diagram conceptually illustrating the aspect of the aluminum nitride particle of the present invention.

FIG. 2 is a diagram conceptually illustrating the aspect of the aluminum nitride particle of the present invention. An aluminum nitride particle 1 of the present invention has a shape such that a lower base 3 of a first truncated six-sided pyramid 1-$a$ and a lower base 3 of a second truncated six-sided pyramid 1-$b$ face each other.

The first and second truncated six-sided pyramids 1-$a$, 1-$b$ each have an upper base 2 and the lower base 3 which are each a hexagonal face. In the present embodiment, an example in which the first and second truncated six-sided pyramids 1-$a$, 1-$b$ are the same truncated six-sided pyramid. However, the first truncated six-sided pyramid 1-$a$ and the second truncated six-sided pyramid 1-$b$ may be different truncated six-sided pyramids.

Given that an area of the upper base 2 of each of the first and second truncated six-sided pyramids 1-$a$, 1-$b$ is S1, and an area of the lower base 3 of each of the first and second truncated six-sided pyramids 1-$a$, 1-$b$ is S2, S1 is not less than 60 $\mu m^2$ and not more than 4800 $\mu m^2$, an area ratio (S1/S2) of S1 to S2 is not less than 0.5 and less than 1, and a height h1 of the first truncated six-sided pyramid 1-$a$ and a height h2 of the second truncated six-sided pyramid 1-$b$ each are not less than 5 $\mu m$ and not more than 20 $\mu m$.

The area S1 is preferably not less than 60 $\mu m^2$ and not more than 4800 $\mu m^2$, and more preferably not less than 100 $\mu m^2$ and not more than 4750 $\mu m^2$. S1/S2 is preferably not less than 0.5 and less than 1, more preferably not less than 0.6 and less than 0.9, and still more preferably not less than 0.7 and less than 0.8. In addition, the height h1 and the height h2 each are preferably not less than 5 $\mu m$ and not more than 20 $\mu m$, and more preferably not less than 6 $\mu m$ and not more than 18 $\mu m$. Further, the height h1 and the height h2 each are preferably a height not larger than the longest diameter which constitutes the lower base 3, and more preferably a height not larger than 70% of the above longest diameter.

Figure 3:
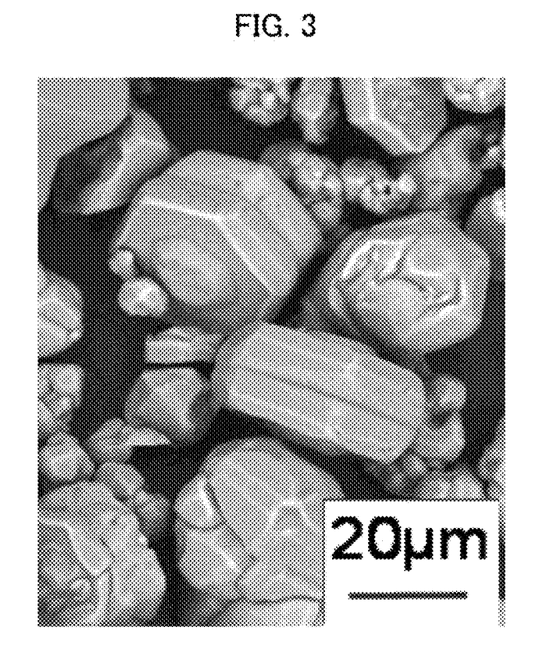
FIG. 3 is a view of a scanning electron micrograph illustrating an aspect of a particle structure of aluminum nitride particles of the present invention.

The shape of the aluminum nitride particles of the present invention is not limited only to the shape illustrated in FIG. 2, but the aluminum nitride particles include aluminum nitride particles having the following shape. FIG. 3 is an SEM micrograph of an aspect of representative aluminum nitride particles of the present invention obtained in Example 1 (described later), which is captured at a magnification of 500 times. As illustrated in FIG. 3, the aluminum nitride particles of the present invention have a shape such that the lower base 3 of the first truncated six-sided pyramid 1-$a$ and the lower base 3 of the second truncated six-sided pyramid 1-$b$ face each other with a columnar portion 1-$c$ sandwiched therebetween. Such particles can be formed together with the particles having the structure illustrated in FIG. 2, by the production method (described later).

Figure 4:
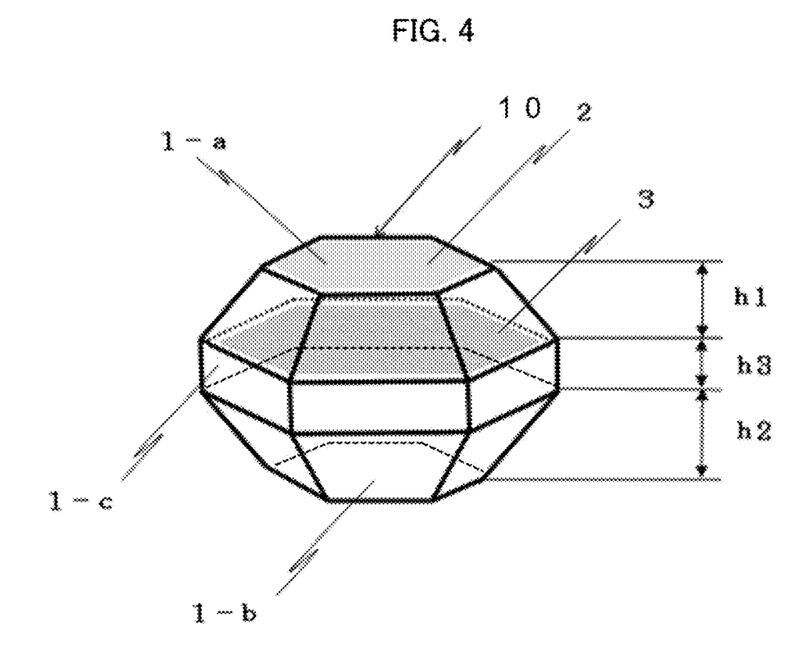
FIG. 4 is a diagram conceptually illustrating another aspect of the aluminum nitride particle of the present invention.

FIG. 4 is a diagram conceptually illustrating an aspect of the aluminum nitride particle of the present invention. In an aluminum nitride particle 10 of the present invention, a first truncated six-sided pyramid 1-$a$ and a second truncated six-sided pyramid 1-$b$ respectively constitute one end part and another end part of the aluminum nitride particle 10. A sum of a height h1 and a height h2 accounts for not less than 90% of a height of the aluminum nitride particle 10.

The sum of the height h1 and the height h2 is preferably not less than 90%, more preferably not less than 95%, more preferably not less than 97%, and still more preferably not less than 99% of the height of the aluminum nitride particle 10. In addition, the sum of the height h1 and the height h2 may account for 100% of the height of the aluminum nitride particle of the present invention. Examples of an aluminum nitride particle having such features include the aluminum nitride particle 1 illustrated in FIG. 2.

Provided that the area S1, S1/S2, and the heights h1 and h2 fall within the respective ranges described above, the aluminum nitride particles 1 and 10 of the present invention have large particle diameters and are polyhedral. This increases opportunities for particles to contact each other and improves thermal conduction. Furthermore, such conditions yield smooth faces which constitute the polyhedron, and thus enable prevention of an increase in viscosity of a resin composition. Note that the areas S1 and S2 and the heights h1 and h2 represent average values measured by the measurement methods discussed in the Examples (described later).

The conceptual diagrams in FIGS. 2 and 4 are conceptual diagrams schematically illustrating the aluminum nitride particles of the present invention. Although each of the truncated six-sided pyramids 1-*a* and 1-*b* is thus a perfect truncated six-sided pyramid, ridge portions of the truncated six-sided pyramid may be deformed to a certain degree, provided that the truncated six-sided pyramids have sloping side faces as illustrated in FIGS. 1 and 3. Specifically, the ridge portions of the bases of each truncated six-sided pyramid may be formed by a surface with a width, as illustrated in FIGS. 1 and 3. More specifically, the truncated six-sided pyramid of the aluminum nitride particles of the present invention may be different from the perfect truncated six-sided pyramids as illustrated in FIGS. 1 and 3, provided that an area of a flat portion of a side face of each aluminum nitride particle of the present invention is not less than 60%, and preferably not less than 70% of an area of a side face of the perfect truncated six-sided pyramids.

<Aluminum Nitride Powder>

It is possible to obtain, by a method (described later), aluminum nitride powder containing the aluminum nitride particles of the present invention. A proportion of the aluminum nitride particles of the present invention contained in the aluminum nitride powder of the present invention is preferably not less than 30% by volume, and more preferably not less than 40% by volume. The aluminum nitride powder containing the aluminum nitride particles of the present invention in the proportion falling within the above range makes it possible to sufficiently yield an effect of the aluminum nitride particles of the present invention, even when aluminum nitride powder containing both the aluminum nitride particles of the present invention and another aluminum nitride particles is used as it is, without the need for discriminating between them. Note that the proportion of the aluminum nitride particles of the present invention contained in the aluminum nitride powder of the present invention may be approximately calculated on the basis of an area ratio determined from a planar image which is, for example, an SEM micrograph, or may be calculated through measurement of an actual volume proportion.

<Use of Aluminum Nitride Particles>

A use of the aluminum nitride particles of the present invention is not limited to a particular use, and the aluminum nitride particles of the present invention are applicable to known uses without limitation. Examples of a preferred use include a filler for resin which is used to fill a resin in order, for example, to impart thermal conduction. As a use of the aluminum nitride particles of the present invention, a resin composition including such a filler for resin and a resin has high thermal conduction.

Accordingly, it is possible to suitably use the aluminum nitride particles of the present invention as a filler for a solid or liquid thermal interface material, which is typified by a heat-dissipating sheet or a heat-dissipating gel for electronic components.

<Resin>

A resin used in the present invention is not limited to a particular resin, and known resins can be used without limitation. Examples of the resin include a thermoplastic resin such as polyolefin, a vinyl chloride resin, a methyl methacrylate resin, nylon, and a fluorine resin, a thermosetting resin such as an epoxy resin, a silicone resin, a phenol resin, a urea resin, a melamine resin, an unsaturated polyester resin, and a silicon resin, synthetic rubber, and the like. One of these resins may be used singly, or two or more of these resins may be used in combination.

<Resin Composition>

The resin composition of the present invention is obtained in a manner, appropriate to the type of the resin, in which the aluminum nitride particles of the present invention and any of the above resins are uniformly mixed by means of a known mixing device to cause the aluminum nitride particles of the present invention to be present in the resin in a dispersed manner. As the mixing device, a standard kneader such as, for example, a roll, a kneader, a Banbury mixer, and a planetary centrifugal mixer is typically used.

The resin composition of the present invention may contain some other component, in addition to the aluminum nitride powder of the present invention and a resin, within the bounds of not significantly impairing the advantageous effect of the aluminum nitride particles of the present invention. Examples of the component which may be included in the resin composition of the present invention include fillers such as aluminum nitride, alumina, boron nitride, zinc oxide, silicon nitride, silicon carbide, and graphite which are different from the aluminum nitride particles of the present invention. One or more of these fillers may be used to fill a resin. Shapes and average particle diameters of the aluminum nitride powder of the present invention and the other filler(s) can be selected according to a use and the like.

<Method for Producing Aluminum Nitride Powder>

A method for producing the aluminum nitride powder of the present invention includes, in addition to a typical step of producing aluminum nitride powder, a reduction-nitridation step of adjusting a concentration of $Na_2O$ and a gas composition to fall within respective predetermined ranges, and a retention step of retaining the aluminum nitride powder formed in the reduction-nitridation step at a predetermined temperature. The typical step of producing aluminum nitride powder is not limited to a particular step, and is, for example, a production method by reducing and nitriding alumina. A representative production method is as follows.

According to the method for producing the aluminum nitride powder of the present invention, a known material such as, for example, α-alumina and γ-alumina can be used as alumina powder which is one component of the above raw materials. Of these types of alumina, α-alumina is suitably used.

In particular, to produce the aluminum nitride particles of the present invention at a high yield, it is preferable to use alumina such that a sodium content of the alumina is regulated to be lower than that of commonly used alumina. An $Na_2O$ content of the alumina is preferably not more than 0.1% and more preferably in a range of 0.01% to 0.05%. In addition, an average particle diameter of the alumina powder is preferably in a range of 0.5 μm to 50 μm, and more preferably in a range of 1 μm to 30 μm.

According to the method for producing the aluminum nitride powder of the present invention, known carbon powder such as, for example, furnace black, channel black, thermal black, and acetylene black can be used as carbon powder which acts as a reducing agent. An average particle diameter of the carbon powder is preferably not more than 100 nm, and more preferably not more than 50 nm. A DBP absorption amount of the carbon powder is preferably in a range of 50 $cm^3/100$ g to 150 $cm^3/100$ g, and more preferably in a range of 70 $cm^3/100$ g to 130 $cm^3/100$ g.

Further, according to the method for producing the aluminum nitride powder of the present invention, a synthetic resin condensate such as a phenol resin, a melamine resin, and an epoxy resin, a hydrocarbon compound such as pitch and tar, an organic compound such as cellulose, sucrose, starch, polyvinylidene chloride, and polyphenylene, and the like can be used, as a carbon source, within the bounds of not impairing the advantageous effect of the present invention.

According to the method for producing the aluminum nitride powder of the present invention, the sulfur component, which acts during the operation of adjusting an atmosphere for a reduction-nitridation reaction (described later), is necessary to form the aluminum nitride particles of the present invention. The type of a sulfur compound is not limited to a particular type, provided that the sulfur component of the sulfur compound is capable of forming a eutectic mixture with the alumina powder, which is a raw material. Examples of such a sulfur compound include a simple substance of sulfur, aluminum sulfide, nitrogen sulfide, thiouric acid, and the like. As the sulfur component, one of the above sulfur compounds may be used singly or some of the above sulfur compounds may be used in combination. A sulfur component is originally included in carbon powder in some cases, and such a sulfur component acts as part of the sulfur component of the present invention.

According to the method for producing the aluminum nitride powder of the present invention, the carbon powder, when used in an excessive amount, suppresses contact between the alumina particles and thus prevents the grain growth. Accordingly, the obtained aluminum nitride particles tend to be small in particle diameter. Therefore, the carbon powder is used in an amount in a range of preferably not less than 36 parts by weight and not more than 200 parts by weight, and more preferably not less than 40 parts by weight and not more than 100 parts by weight, relative to 100 parts by weight of the alumina powder.

Further, according to the method for producing the aluminum nitride powder of the present invention, an amount of the sulfur component present in the raw material mixture including the alumina powder and the carbon powder is, in terms of a sulfur element, preferably not less than 0.8 parts by weight and not more than 20 parts by weight, and more preferably not less than 1.0 parts by weight and not more than 10 parts by weight, relative to 100 parts by weight of the alumina powder. It is possible to prepare the sulfur component to be used in an amount which meets the above-described sulfur component range by appropriately adjusting an amount of sulfur contained in the above carbon powder and an amount of sulfur powder and/or a sulfur compound to be added to the raw material mixture in consideration of these amounts. In a case where the above range is met in consideration of the amount of sulfur contained in the carbon powder, an amount of the carbon powder to be used may be adjusted such that the amount of the sulfur component falls within the above range. Alternatively, carbon powder rich in sulfur and carbon powder poor in sulfur may be used in such a manner that a mixture ratio between the two types of carbon powder is adjusted so that the amount of the sulfur component falls within the above range.

A method for mixing the above raw material mixture is not limited to a particular method, provided that the method allows the components of the mixture to be uniformly mixed. For the mixing, a mixing machine such as, for example, a vibrating mill, a bead mill, a ball mill, a Henschel mixer, a drum mixer, a vibrating shaker, and a V-shaped mixing machine can be used.

The method for producing the aluminum nitride powder of the present invention is preferably a method of heating, in a reactor, the raw material mixture including the above alumina powder, carbon powder, and sulfur component at a temperature in a range of preferably not less than 1500° C. and not more than 2000° C. under circulation of a nitrogen gas, to reduce and nitride the above alumina powder, and then retaining, under an atmosphere in which the aluminum nitride powder is not oxidized, the aluminum nitride powder for not less than one hour, preferably not less than two hours, and more preferably not less than five hours, while maintaining the heating temperature.

According to the method, the above reduction-nitridation reaction is performed, with the gas composition of the above nitrogen gas atmosphere being set such that the nitrogen gas is in a range of 85% by volume to 30% by volume and a diluent gas is in a range of not less than 15% by volume and not more than 70% by volume, in a range of a nitriding rate of not less than 3% and not more than 50%.

The above diluent gas is caused to be present in the atmosphere with an aim to adjust a proportion of the nitrogen gas present in the nitrogen gas atmosphere. Examples of the diluent gas include a gas of carbon monoxide alone, and a mixture gas obtained by partially replacing the carbon monoxide gas with an inert gas such as an argon gas. Note that although carbon monoxide gas is generated during the reduction-nitridation reaction, the diluent gas concentration equal to or higher than the above concentration is maintained by adjusting the diluent gas concentration in the nitrogen gas to be supplied.

According to the above production method, since a more proportion of the diluent gas included in the supplied nitrogen gas leads to a longer time for the reduction-nitridation reaction, an upper limit of the proportion is preferably not more than 70% by volume in consideration of production efficiency. Further, an upper limit of a time period for heat retention after the completion of the reduction-nitridation reaction is not limited to a particular time period, but is approximately 10 hours.

According to the above method, it is preferable to perform the reduction-nitridation reaction with a nitrogen gas circulating in the reactor in which the raw material mixture is placed. In this case, the proportion of the diluent gas present in the nitrogen gas atmosphere in which the raw material mixture is present can be determined by measuring the gas composition of an emission gas emitted from the reactor.

According to the present invention, the diluent gas accounting for less than 15% by volume of the supplied nitrogen gas increases the rate of the reduction-nitridation reaction. This causes insufficient grain growth, and thus makes it difficult not only to increase the particle diameter but also to obtain an aluminum nitride particle having the above characteristic shape.

According to the present invention, a method for adjusting the proportion of the diluent gas in the nitrogen gas atmosphere in the reactor includes, for example, (1) a method of mixing, with a nitrogen gas, a separately-prepared diluent gas in a predetermined amount, and supplying a raw material mixture to, for example, a carbon container of which an upper surface is open, i.e., a reactor placed and installed in a setter, and (2) a method of placing, in the setter, the raw material mixture in the form of relatively thick layers and supplying a nitrogen gas into the setter so that an amount of the nitrogen gas diffused into the layers is controlled, to form an atmosphere having a high proportion of the diluent gas in the nitrogen gas atmosphere.

In method (2), a thickness of the raw material mixture in the setter is preferably not less than 10 mm, and in particular, not less than 15 mm, in order to adjust, to be in the above range, the proportion of the diluent gas present in the nitrogen gas atmosphere in a case where a nitrogen gas gets in empty spaces inside the setter and the reduction-nitridation reaction progresses. In addition, in a case where the raw material mixture is too thick, the nitrogen gas is less likely to be supplied and an upper limit of the thickness is thus preferably not more than 100 mm.

The reduction-nitridation step of the present invention can be performed by using a known device which is capable of controlling a reaction atmosphere. Example of such a device include an atmosphere control-type high-temperature furnace in which heating treatment is performed by high-frequency induction heating or by heating with a heater. In addition to a batch furnace, a continuous nitridation reaction furnace such as a pusher-type tunnel furnace and a lyriform furnace, and other furnace can be used as appropriate depending on the above method.

According to the method for producing the aluminum nitride powder of the present invention, since the aluminum nitride powder after the reduction-nitridation reaction includes an excessive amount of carbon powder, it is preferable to remove the excessive amount of carbon powder as needed by oxidation treatment. As an oxidizing gas used while performing the oxidation treatment, gases capable of removing carbon, such as air, oxygen, and carbon dioxide, can be employed without limitation. Further, a typical treatment temperature is preferably not less than 500° C. and not more than 900° C.

The present invention is not limited to the above embodiments, but can be altered by a skilled person in the art within the scope of the claims. The present invention also encompasses, in its technical scope, any embodiment derived by combining technical means disclosed in differing embodiments.

EXAMPLES

Although Examples for discussing the present invention in more detail will be described below, the present invention is not limited to these examples.

[Physical Property of Raw Material]

The physical properties of the raw materials used in Examples and Comparative Examples are indicated below.

<Alumina Powder>
α-alumina A: D50 2.6 μm, $Na_2O$ 0.04%
α-alumina B: D50 4.3 μm, $Na_2O$ 0.26%
<Carbon Powder>
Carbon powder: average particle diameter 19 nm, DBP absorption amount 116 $cm^3$/100 g, sulfur content 210 ppm
<Sulfur Component>
Sulfur powder: purity not less than 98%

[Measurement Method for Aluminum Nitride Particles]

Various methods for measuring the aluminum nitride particles in Example and Comparative Examples are indicated below.

<Proportion of Aluminum Nitride Particles of the Present Invention Contained in Aluminum Nitride Powder>

SEM micrographs of aluminum nitride particles in the aluminum nitride powder were captured at a magnification of 500 times, and a proportion of the aluminum nitride particles of the present invention contained in the aluminum nitride powder was calculated from the above micrographs by an image analysis.

<Upper Base and Lower Base Areas of Truncated Six-Sided Pyramid>

SEM (TM3030 available from Hitachi High-Technologies Corporation) micrographs of the aluminum nitride particles in the aluminum nitride powder were captured at a magnification of 500 times. Out of the aluminum nitride particles of the present invention in the captured micrographs, 10 particles were arbitrarily selected, and the areas S1 of the upper bases and the areas S2 of the lower bases of the truncated six-sided pyramids were measured to calculate the respective average values. Ratios S1/S2 were also determined from the measured areas S1 and S2. In addition, out of the aluminum nitride particles of the present invention, 10 particles were arbitrarily selected, and the heights h1 of the first truncated six-sided pyramids, the heights h2 of the second truncated six-sided pyramids, and the heights h3 of the columnar portions were measured to calculate the respective average values.

[Production Method and Measurement of Aluminum Nitride Powder]

Example 1

To a mixture composed of 100 parts by weight of alumina powder A and 50 parts by weight of the carbon powder, sulfur powder was added such that a sulfur component in the mixture is contained in an amount of one part by weight relative to 100 parts by weight of the above alumina powder. The mixture and the sulfur powder were mixed by a vibrating shaker until they were uniformly mixed, to obtain a raw material mixture.

The raw material mixture was placed in a carbon setter such that the thickness of the raw material mixture is 20 mm, and nitrogen was set in a reactor in which the nitrogen can circulate. A reduction-nitridation reaction was performed at a heating temperature of 1760° C. while the nitrogen gas was circulated.

The reduction-nitridation reaction was performed while the proportion of a carbon monoxide gas supplied to the reactor was adjusted to be 32% by volume. After the reduction-nitridation reaction was completed, a reaction product was retained for 10 hours while the heating temperature was maintained, and the reaction product was taken out of the reactor.

Subsequently, the reaction product was heated at 665° C. in an air atmosphere for eight hours to remove unreacted carbon powder by combustion, and an aluminum nitride powder of Example 1 was obtained. Table 1 shows the composition of the raw material and the proportion of the carbon monoxide gas in the nitrogen gas.

A proportion of the aluminum nitride particles of the present invention contained in the aluminum nitride powder of Example 1 was calculated by the above-described method. In addition, by the above-described method, the ratio S1/S2 was calculated from S1 and S2 of the aluminum nitride particles of the present invention contained in the aluminum nitride powder of Example 1, and the particle heights h1, h2, and h3 were measured.

Examples 2 and 3

A proportion of the carbon monoxide gas in the nitrogen gas during the reduction-nitridation reaction was changed from that in Example 1, and aluminum nitride powder of Examples 2 and 3 was obtained. Table 1 shows the proportion of the carbon monoxide gas in the nitrogen gas during the reduction-nitridation reaction for each of Examples 2 and 3. A proportion of the aluminum nitride particles of the present invention contained in the aluminum nitride powder of each of Examples 2 and 3 was calculated by the above-described method. In addition, the ratio S1/S2 was calculated from S1 and S2 of the aluminum nitride particles of the present invention contained in the aluminum nitride powder, and the heights h1, h2, and h3 were measured.

Comparative Example 1

Aluminum nitride powder was produced as in Example 1, except that an alumina powder B was used as alumina powder, and the aluminum nitride powder of Comparative Example was obtained. A proportion of the aluminum nitride particles of the present invention contained in the aluminum nitride powder of Comparative Example 1 was measured by the above-described method.

TABLE 1

|  |  | Example | | | Comparative Example |
|---|---|---|---|---|---|
|  |  | 1 | 2 | 3 | 1 |
| Composition of Raw Material | | | | | |
| Alumina | A | 100 | 100 | 100 | |
| Powder | B | | | | 100 |
| Carbon | | 50 | 50 | 50 | 50 |
| Sulfur Component | | 1 | 1 | 1 | 1 |
| Proportion of Carbon Monoxide in Nitrogen Gas [% by Volume] | | 32 | 55 | 62 | 32 |

[Results]

Figure 5:
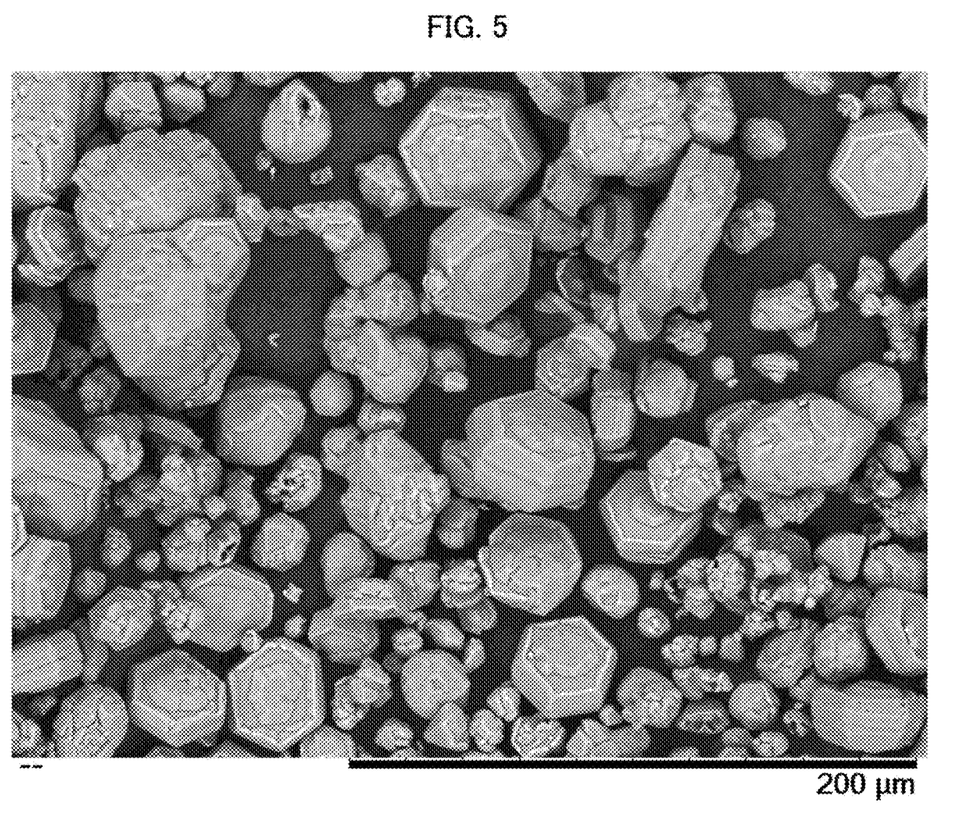
FIG. 5 is a view of a scanning electron micrograph of the aluminum nitride particles in aluminum nitride powder of the present invention.

The SEM micrographs of the aluminum nitride particles of the present invention contained in the aluminum nitride powder obtained by the above method in Example 1 are illustrated in FIGS. 1, 3, and 5. As shown in FIG. 5, the aluminum nitride particles of the present invention illustrated in FIGS. 1 and 3 were identified in the aluminum nitride powder produced by using the raw material that falls within the ranges of an embodiment of the present invention. Further, a proportion of the aluminum nitride particles of the present invention contained in the obtained aluminum nitride powder was calculated by the above method, and found to be approximately 40%.

An SEM micrograph of the aluminum nitride powder of Comparative Example 1 was captured, and it was found that the obtained aluminum nitride powder contained particles each having a hemispherical protrusion on both ends of the hexagonal prism, but did not contain the aluminum nitride particle of the present invention. The aluminum nitride powder of Comparative Example 1 contained the particles each having the spherical protrusion on both ends of the hexagonal prism in a proportion of 43%.

Meanwhile, concerning the aluminum nitride powder of Examples 1 to 3, S1, S2, h1, h2, and h3 were measured in accordance with the above-described method. Concerning Comparative Example 1, only h1, h2, and h3 were measured. Table 2 shows the results.

[Comparison of Thermal Conductivity of Silicone Resin Filled with Aluminum Nitride Powder]

With 100 parts by weight of a two-component liquid silicone resin, condensation type (KE-1013A/B available from Shin-Etsu Chemical Co., Ltd.), 685 parts by weight of the aluminum nitride powder obtained in each of Examples 1 to 3 and Comparative Example 1, and 293 parts by weight of spherical aluminum nitride (available from Tokuyama Corporation) having an average particle diameter of 1 μm were mixed in a mortar to obtain a resin composition. The proportion of the aluminum nitride powder with which the resin was filled was 75% by volume.

Part of the obtained resin composition was casted into a mold and cured to prepare a test piece having a diameter of 1 mm and a thickness of 500 μm, and thermal conduction was measured by using a temperature wave analysis device (ai-Phase Mobile 1u available from ai-Phase Co. Ltd.).

The results were as follows. The thermal conductivities of Examples 1 to 3 were 8.3 W/mK, 8.7 W/mK, and 9.2 W/mK, respectively. Meanwhile, the thermal conductivity of Comparative Example 1 was 7.8 W/mK.

Further, with 100 parts by weight of the two-component liquid silicone resin, condensation type, 913 parts by weight of the aluminum nitride powder obtained in each of Examples 1 to 3 and Comparative Example 1, and 391 parts by weight of the spherical aluminum nitride having an average particle diameter of 1 μm were mixed in a mortar to obtain a resin composition. The proportion of the aluminum nitride powder with which the resin was filled was 80% by volume.

Part of the obtained resin composition was casted into a mold and cured to prepare a test piece having a diameter of 1 mm and a thickness of 500 μm, and thermal conductivities were measured by using a temperature wave analysis device.

The results were as follows. The thermal conductivities of Examples 1 to 3 were 9.2 W/mK, 9.5 W/mK, and 10.0 W/mK, respectively. Meanwhile, the thermal conductivity of Comparative Example 1 was 8.9 W/mK.

Thus, the resin composition containing the aluminum nitride particles of the present invention was shown to have thermal conduction more excellent than that of Comparative Example 1.

INDUSTRIAL APPLICABILITY

The present invention is applicable to electronic components excellent in thermal conduction and dielectric strength.

REFERENCE SIGNS LIST 1, 10 aluminum nitride particles
1-a first truncated six-sided pyramid

TABLE 2

|  | Example | | | Comparative Example |
|---|---|---|---|---|
|  | 1 | 2 | 3 | 1 |
| Average Particle Diameter [μm] | 24 | 50 | 80 | 32 |
| Upper Base Area S1 [μm$^2$] | 308 | 1505 | 3910 | — |
| Lower Base Area S2 [μm$^2$] | 314 | 1980 | 5145 | — |
| Ratio S1/S2 | 0.98 | 0.76 | 0.76 | — |
| Height h1 [μm] | 10 | 8 | 8 | 3 |
| Height h2 [μm] | 10 | 8 | 8 | 10 |
| Height h3 [μm] | 0 | 0 | 0 | 4 |
| Prortion of Particles [%] | 48 | 52 | 60 | 43 |

1-b second truncated six-sided pyramid
1-c columnar portion
2 upper base of truncated six-sided pyramid (area S1)
3 lower base of truncated six-sided pyramid (area S2)
h1 height of first truncated six-sided pyramid
h2 height of second truncated six-sided pyramid

The invention claimed is:

1. An aluminum nitride particle, when observed in a scanning electron micrograph at a magnification of 500 times, comprising
   at least a first truncated six-sided pyramid and a second truncated six-sided pyramid,
   the aluminum nitride particle having a shape such that a lower base of the first truncated six-sided pyramid and a lower base of the second truncated six-sided pyramid face each other, the first truncated six-sided pyramid and the second truncated six-sided pyramid each having an upper base with an area S1 of not less than 60 µm² and not more than 4800 µm², and each having a ratio (S1/S2) of the area S1 to an area S2 of the lower base of not less than 0.6 and less than 0.8,
   the first truncated six-sided pyramid and the second truncated six-sided pyramid respectively having a height h1 and a height h2 each being not less than 5 µm and not more than 20 µm,
   the first truncated six-sided pyramid and the second truncated six-sided pyramid respectively constituting one end part and another end part of the aluminum nitride particle,
   a sum of the height h1 and the height h2 accounting for not less than 95% of a height of the aluminum nitride particle.

2. The aluminum nitride particle according to claim 1, wherein the aluminum nitride particle has a shape such that the lower base of the first truncated six-sided pyramid and the lower base of the second truncated six-sided pyramid join.

3. Aluminum nitride powder containing an aluminum nitride particle according to claim 1 in an amount of not less than 30% by volume.

4. A filler for resin composed of aluminum nitride powder according to claim 3.

5. A resin composition comprising a filler for resin according to claim 4 and a resin.

6. A method for producing aluminum nitride powder according to claim 2 by reducing and nitriding a raw material mixture including alumina powder, carbon powder, and a sulfur component, the method comprising:
   a reduction-nitridation step of reducing and nitriding the raw material mixture under conditions where (i) a concentration of $Na_2O$ to be included in the raw material mixture is adjusted to be not more than 0.1% by mass, and (ii) at least in a range of a nitriding rate of not less than 3% and not more than 50%, a gas is composed of a nitrogen gas in an amount of not less than 30% by volume and not more than 85% by volume, and a diluent gas in an amount of not less than 15% by volume and not more than 70% by volume; and
   a retention step of retaining, under an atmosphere in which the aluminum nitride powder formed in the reduction-nitridation step is not oxidized, the aluminum nitride powder for not less than one hour while maintaining a temperature within a variation of plus or minus 30° C. from a heating temperature for the reduction-nitridation step.

* * * * *